(12) United States Patent
Danis et al.

(10) Patent No.: US 8,387,358 B2
(45) Date of Patent: Mar. 5, 2013

(54) GAS TURBINE ENGINE STEAM INJECTION MANIFOLD

(75) Inventors: Allen Michael Danis, Mason, OH (US); Steven Marakovits, Mason, OH (US); Edward Joseph Stiftar, West Chester, OH (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 12/696,241

(22) Filed: Jan. 29, 2010

(65) Prior Publication Data

US 2011/0185699 A1 Aug. 4, 2011

(51) Int. Cl.
*F02C 7/00* (2006.01)
(52) U.S. Cl. .................................................... 60/39.53
(58) Field of Classification Search ................ 60/39.53, 60/39.3, 39.59, 39.58, 39.55, 39.092, 751, 60/39.182; 415/121.2, 169.1, 144, 145, 208.3, 415/208.4
See application file for complete search history.

(56) References Cited

U.S. PATENT DOCUMENTS

| | | | | |
|---|---|---|---|---|
| 2,686,631 A | * | 8/1954 | Jordan | 415/116 |
| 4,503,668 A | * | 3/1985 | Duncan et al. | 60/799 |
| 4,507,914 A | * | 4/1985 | Rice | 60/39.17 |
| 4,631,914 A | | 12/1986 | Hines | |
| 4,870,826 A | * | 10/1989 | Daguet et al. | 60/751 |
| 4,893,468 A | | 1/1990 | Hines | |
| 4,982,564 A | | 1/1991 | Hines | |
| 5,054,279 A | | 10/1991 | Hines | |
| 5,187,931 A | * | 2/1993 | Taylor | 60/806 |
| 5,211,003 A | * | 5/1993 | Samuel | 60/772 |
| 5,239,816 A | * | 8/1993 | Holt, III | 60/39.55 |
| 5,249,921 A | * | 10/1993 | Stueber et al. | 415/138 |
| 5,271,218 A | | 12/1993 | Taylor | |
| 5,323,604 A | | 6/1994 | Ekstedt et al. | |
| 5,340,274 A | * | 8/1994 | Cunha | 415/115 |
| 5,592,821 A | * | 1/1997 | Alary et al. | 60/751 |
| 5,632,141 A | * | 5/1997 | Sloop et al. | 60/782 |
| 5,697,209 A | * | 12/1997 | Wettstein | 60/39.53 |
| 7,104,749 B2 | * | 9/2006 | Frutschi | 415/1 |
| 7,523,603 B2 | * | 4/2009 | Hagen et al. | 60/39.55 |
| 2001/0022076 A1 | * | 9/2001 | Muyama et al. | 60/39.182 |
| 2002/0092303 A1 | * | 7/2002 | Al-Roub et al. | 60/772 |
| 2006/0162336 A1 | * | 7/2006 | Cayre et al. | 60/751 |
| 2009/0180939 A1 | * | 7/2009 | Hagen et al. | 422/194 |

* cited by examiner

*Primary Examiner* — Gerald Sung
(74) *Attorney, Agent, or Firm* — General Electric Company; David J. Clement; Matthew P. Hayden

(57) ABSTRACT

A gas turbine engine steam injector includes an annular steam injection manifold aftwardly bounded by an aft manifold wall having steam injection holes disposed therethrough and located axially aft and radially inwardly of a diffuser outlet. An outer baffle wall around manifold has a curved convex surface which may generally conform to a streamline emanating from outlet. Holes may be circumferentially evenly distributed and non-uniformly sized around the aft manifold wall. Hollow struts extend between radially outer and inner bands of a diffuser and a steam supply header in steam supply communication with a fluid passage of at least one of the struts having a passage outlet open to steam cavity within cavity casing located inwardly of inner band. Openings are disposed in an aft cavity wall between cavity and the injector. Passages may be in only a non-uniformly distributed portion of the struts adjacent to each other.

29 Claims, 5 Drawing Sheets

GAS TURBINE ENGINE STEAM INJECTION MANIFOLD

BACKGROUND OF THE INVENTION

1. Field of the Invention

This invention relates generally to gas turbine engines and, more particularly, to steam injection into combustion sections of such engines.

2. Description of Related Art

Air pollution concerns worldwide have led to stricter emissions standards. These standards regulate the emission of oxides of nitrogen (NOx), unburned hydrocarbons (HC), and carbon monoxide (CO) generated as a result of gas turbine engine operation. In particular, nitrogen oxide is formed within a gas turbine engine as a result of high combustor flame temperatures. Gas turbine engine designers and manufacturers are constantly striving to lower NOx emissions so to meet international, federal, and local air pollution standards. This effort has resulted in the use of lean premixed combustion systems in which fuel and air are mixed homogeneously upstream of the flame reaction region. The fuel-air ratio or the equivalence ratio at which these combustion systems operate are much "leaner" compared to more conventional combustors in order to maintain low flame temperatures which in turn limits production of unwanted gaseous NOx emissions to acceptable levels. Steam injection for providing steam to a combustion zone of the combustor has also been developed for achieving low NOx emissions.

Steam injection increases the mass flow and therefore increases the power output and steam injection ahead of the combustion reaction zone reduces the amount of oxides of nitrogen generated in the combustion process. Steam injection is particularly applicable to marine and industrial gas turbine engines which are often located in environments where steam is readily available.

Aircraft engine derivative annular combustion systems, such as the LM series of gas turbine engines from the General Electric Company, have been developed to incorporate steam injection. U.S. Pat. No. 5,239,816 entitled "Steam deflector assembly for a steam injected gas turbine engine" discloses a steam injection system for injecting steam through a steam injection manifold located at a forward end of a combustion chamber casing and located radially inwardly of a diffuser which discharges compressor discharge pressure (CDP) air into the combustion chamber. Such a design is not available to gas turbine engines which have no room radially inwardly of the diffuser for such a steam injection manifold. Furthermore, locating the manifold and injecting steam aft and downstream of the diffuser can cause aerodynamic interference with the flow stream of the CDP air discharging into the combustion chamber reducing performance of the combustor.

It is highly desirable to have an effective means for injecting steam into a gas turbine engine combustion chamber through a steam injection manifold located aft and downstream of the diffuser with a minimum of aerodynamic interference with the flow stream of the CDP air discharging into the combustion chamber from the diffuser. It is also desirable to provide for a circumferentially uniform or axisymmetrical distribution of the steam injection from the steam injection manifold into the combustion chamber.

BRIEF SUMMARY OF THE INVENTION

A gas turbine engine steam injector includes an annular steam injection manifold aftwardly bounded by an aft manifold wall located axially aft and radially inwardly of a diffuser outlet and steam injection holes disposed through and circumferentially around the aft manifold wall.

An exemplary embodiment of the steam injector further includes the steam injection holes being circumferentially evenly distributed around the aft manifold wall. The steam injection holes facing axially aftwardly or downstream may have normals perpendicular to aft planes of the steam injection holes and generally parallel to a centerline about which the annular steam injection manifold is circumscribed. The steam injection holes may be non-uniformly sized around the aft manifold wall and may have non-uniform exit areas. The steam injection holes may be circular having non-uniform diameters.

The exemplary embodiment of the steam injector includes an annular baffle having an annular radially outer baffle wall radially outwardly bounding the steam injection manifold, narrowing in an aftwardly or downstreamwise direction, and having a curved convex surface that may generally conform to a streamline emanating from a diffuser outlet of a diffuser.

The steam injector may be incorporated in a gas turbine engine steam injection system including the diffuser which includes radially outer and inner bands and hollow struts extending therebetween, an annular outer steam supply header spaced radially outwardly of the diffuser in steam supply communication with a fluid passage of at least one of the struts, and a passage outlet of the fluid passage open to a steam cavity within an annular cavity casing located radially inwardly of the inner band. Openings in and aft cavity wall between the steam cavity and the steam injector allows steam to pass therebetween for injection through the steam injection holes disposed through and circumferentially around the aft manifold wall.

One embodiment of the injection system includes the annular outer steam supply header being in steam supply communication with fluid passages in only a portion of the struts, the portion of the struts being circumferentially non-uniformly distributed around the diffuser, and the steam injection holes being circumferentially evenly distributed and non-uniformly sized around the aft manifold wall. In a more particular embodiment of the injection system the struts in the portion are adjacent to each other.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
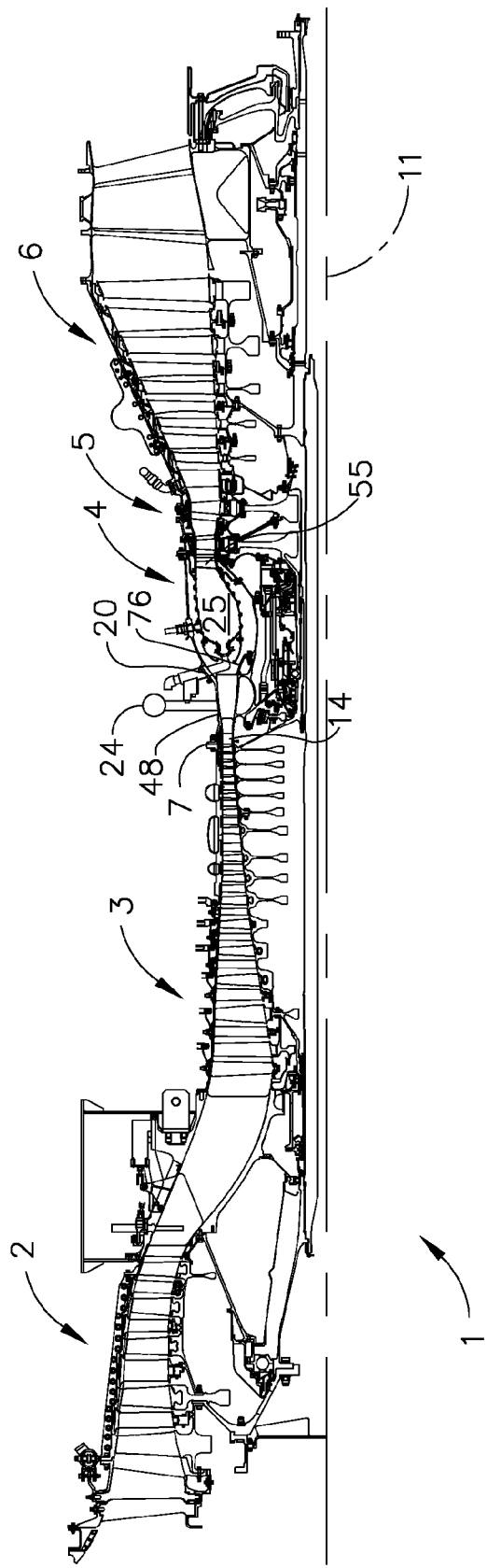
FIG. 1 is a cross-sectional view illustration of a marine and industrial gas turbine engine having an annular steam injection manifold downstream of a diffuser.

Referring now to the drawings in detail wherein identical numerals indicate the same elements throughout the figures. FIG. 1 illustrates a marine and industrial axial flow gas turbine engine 1 including in downstream serial flow relationship, a low pressure compressor section 2, a high pressure compressor section 3, a combustor section 4, a high pressure turbine section 5, and a low pressure turbine section 6 radially disposed about an engine centerline 11. The combustor section 4 is disposed between a diffuser 48 downstream of a last stage 7 of compressor outlet guide vanes 14, and a turbine nozzle 55 as more particularly illustrated in FIG. 2. The combustor section 4 includes a combustor 10 suitable for use in a gas turbine engine and, in particular, for a low NOx marine/industrial gas turbine engine.

A steam injection system 20 is provided for supplying steam 22 from an annular steam supply header 24, spaced radially outwardly of the diffuser 48, to a steam injector 76 operable to inject the steam 22 into combustor section 4. The steam injection system 20 provides the steam 22 to a combustion zone 25 of the combustor 10 for reducing NOx emissions from the engine.

Figure 2:
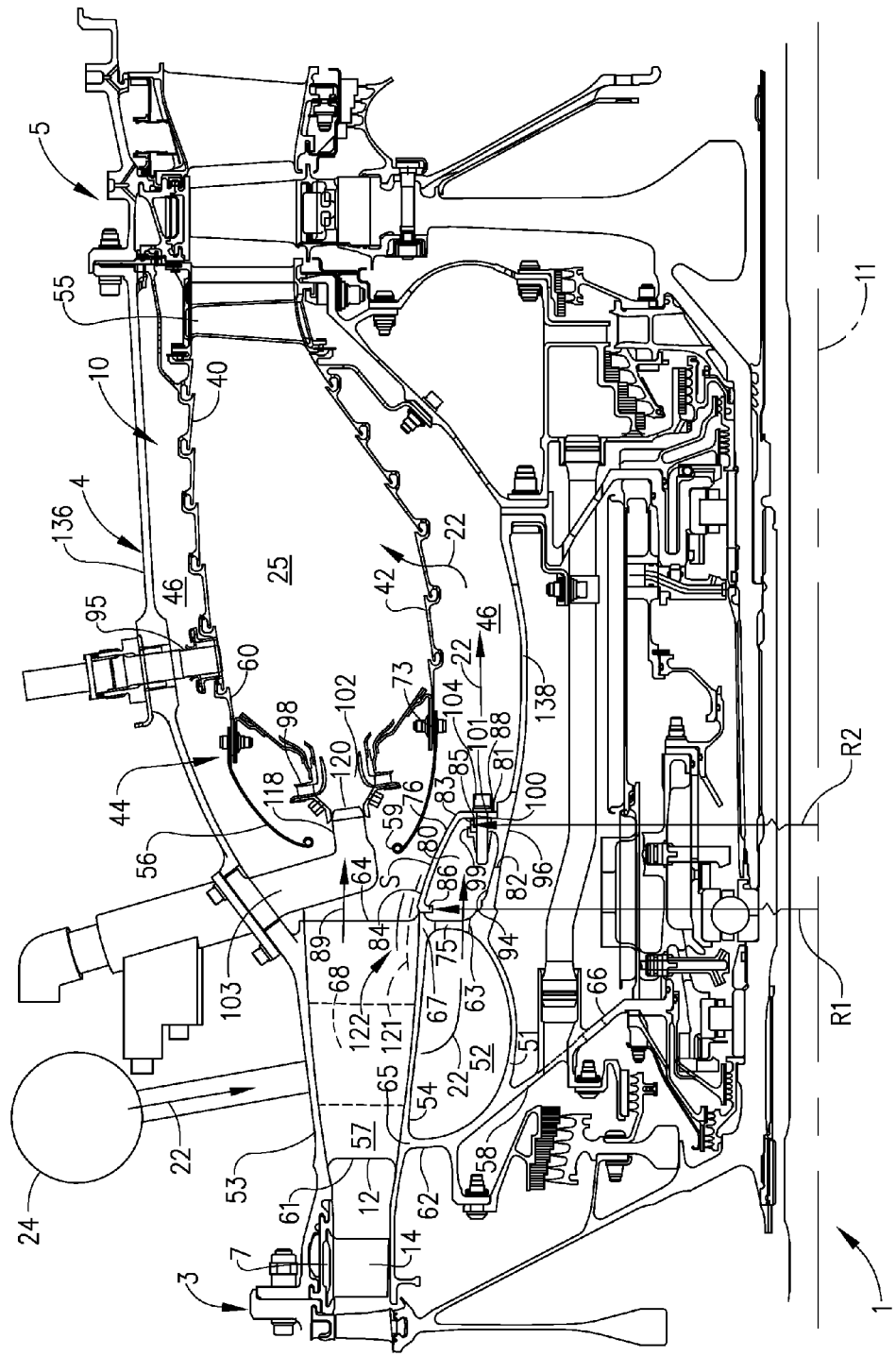
FIG. 2 is an enlarged cross-sectional view illustration of the diffuser, the steam injection manifold, and combustor of the engine illustrated in FIG. 1.

Referring more particularly to FIG. 2, the combustor 10 is illustrated herein as an annular combustor including radially spaced apart annular outer and inner combustor casings 136, 138. Radially spaced apart annular outer and inner combustor liners 40, 42 surrounding the combustion zone 25 therebetween are radially disposed between the outer and inner combustor casings 136, 138. A domed end 44 extends radially between the outer and inner combustor liners 40, 42, respectively. An annular combustion chamber 46 extends radially between the outer and inner combustor casings 136, 138. The outer and inner combustor casings 136, 138 extend aft and downstream from the diffuser 48. The outer and inner combustor liners 40, 42 extend axially downstream to the turbine nozzle 55.

The combustor domed end 44 is illustrated herein as having a single combustor dome 56 but other types may be used such as plurality of combustor domes arranged in a triple annular configuration as illustrated in U.S. Pat. No. 5,239,816 or a double annular configuration. The combustor dome 56 includes a radially outer end 60 fixedly attached to the outer combustor liner 40 and a radially inner end 73 attached to the inner combustor liner 42. An igniter 95 extends through the outer combustor casing 136 and is disposed in the outer combustor liner 40. The combustor dome 56 supports an annular array or annulus 118 of burners 120 having carburetors 98 that are supplied with fuel and air via premixers 102 with premixer cups fed from a fuel supply system (not shown). A plurality of fuel tubes 103 extend between a fuel source (not shown) and the carburetors 98 in the combustor dome 56.

Figure 3:
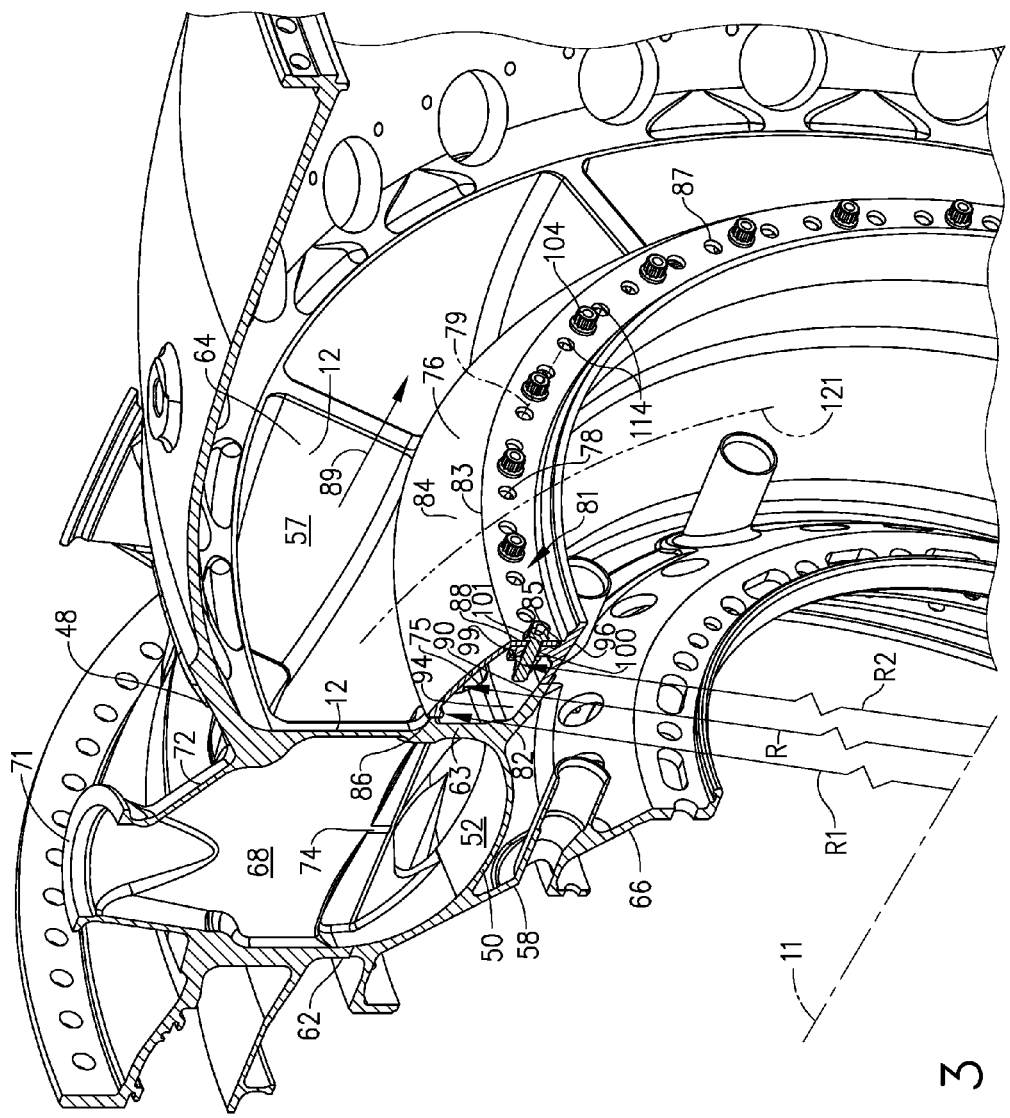
FIG. 3 is a cut away perspective view illustration of a portion of a steam injection apparatus including the steam injection manifold illustrated in FIG. 1.

Referring to FIGS. 2 and 3, the outer and inner combustor casings 136, 138 are joined together though a plurality of radially extending struts 12 which radially extend between radially spaced apart outer and inner bands 53, 54. Diffuser passages 57 of the diffuser 48 are bounded radially by the outer and inner bands 53, 54 and circumferentially by the struts 12. The diffuser passages 57 and the diffuser 48 extend downstream and axially aftwardly from a diffuser inlet 61 to a diffuser outlet 64.

An annular steam cavity 52 located radially inwardly of the inner band 54 is bounded by an annular cavity casing 50. The cavity casing 50 includes the inner band 54 and a curved inner cavity wall 51 and axially spaced apart and radially extending forward and aft cavity walls 62, 63. The forward and aft cavity walls 62, 63 are attached to the inner band 54 at forward and aft positions 65, 67 respectively along the inner band 54. A conical casing 58 attached to or integral with the cavity casing 50 extends radially inwardly and axially aftwardly. The conical casing 58, the cavity casing 50, and the diffuser 48 provide at least in part a compressor rear frame 66 of the engine 1.

Referring to FIGS. 2 and 3, one or more of the struts 12 are hollow having a radially extending fluid passage 68 within the strut 12. A steam supply system 70 includes the outer steam supply header 24 connected to the fluid passage 68 of at least one of the struts 12 by a header pipe 69. Each of these hollow struts 12 includes a passage inlet 71 to the fluid passage 68 at a radially outer end 72 of the strut 12 and a passage outlet 74 leading to the steam cavity 52 within the cavity casing 50. Openings 75 in the aft cavity wall 63 between the steam cavity 52 and the steam injector 76 allow steam supplied to the steam cavity 52 through the hollow struts 12 to pass into the steam injector 76. The steam injector 76 injects the steam through steam injection holes 78 located axially aft and downstream and radially inwardly of the diffuser outlet 64 and into the combustion chamber 46.

The steam injector 76 includes an annular steam injection manifold 80 forwardly bounded by the aft cavity wall 63, aftwardly bounded by an annular aft manifold wall 81, and radially inwardly bounded by a radially inner annular wall 82. The steam injector 76 is illustrated herein as extending aftwardly or downstream past an upstream or forward end 59 of the combustor dome 56 and being located radially inwardly of the combustor dome 56.

The steam injector 76 further includes an annular baffle 83 bounding the steam injection manifold 80. The annular baffle 83 includes an annular radially outer baffle wall 84 extending aftwardly from a forward baffle flange 86 to an aft baffle flange 88. The forward and aft baffle flanges 86, 88 extend radially inwardly from the outer baffle wall 84. A forward baffle wall 85 extending radially inwardly from the outer baffle wall 84. The annular steam injection manifold 80 is forwardly bounded by the aft cavity wall 63 and radially inwardly bounded by a radially inner annular wall 90.

The inner annular wall 90 is illustrated herein as including an annular ledge 94 extending aftwardly from and integral with the aft cavity wall 63. The annular ledge 94 is connected to an intermediate ring 96 which in turn is connected to the inner combustor casing 138. The annular ledge 94 and the inner combustor casing 138 may be welded to the intermediate ring 96. The intermediate ring 96 includes a radially outwardly extending ring flange 99. A first set of first bolt holes 100 in the ring flange 99 align with a second set of second bolt holes 101 in the aft baffle flange 88 and bolts 104 disposed between aligned sets of the first and second bolt holes 100, 101 radially and axially secure the baffle to the inner annular wall 90. This bolted assembly presses the forward baffle flange 86 of the outer baffle wall 84 against the aft cavity wall 63 thus sealing the steam injection manifold 80 around the aft cavity wall 63. The bolted together ring flange 99 and aft baffle flange 88 form the aft manifold wall 81.

Figure 4:
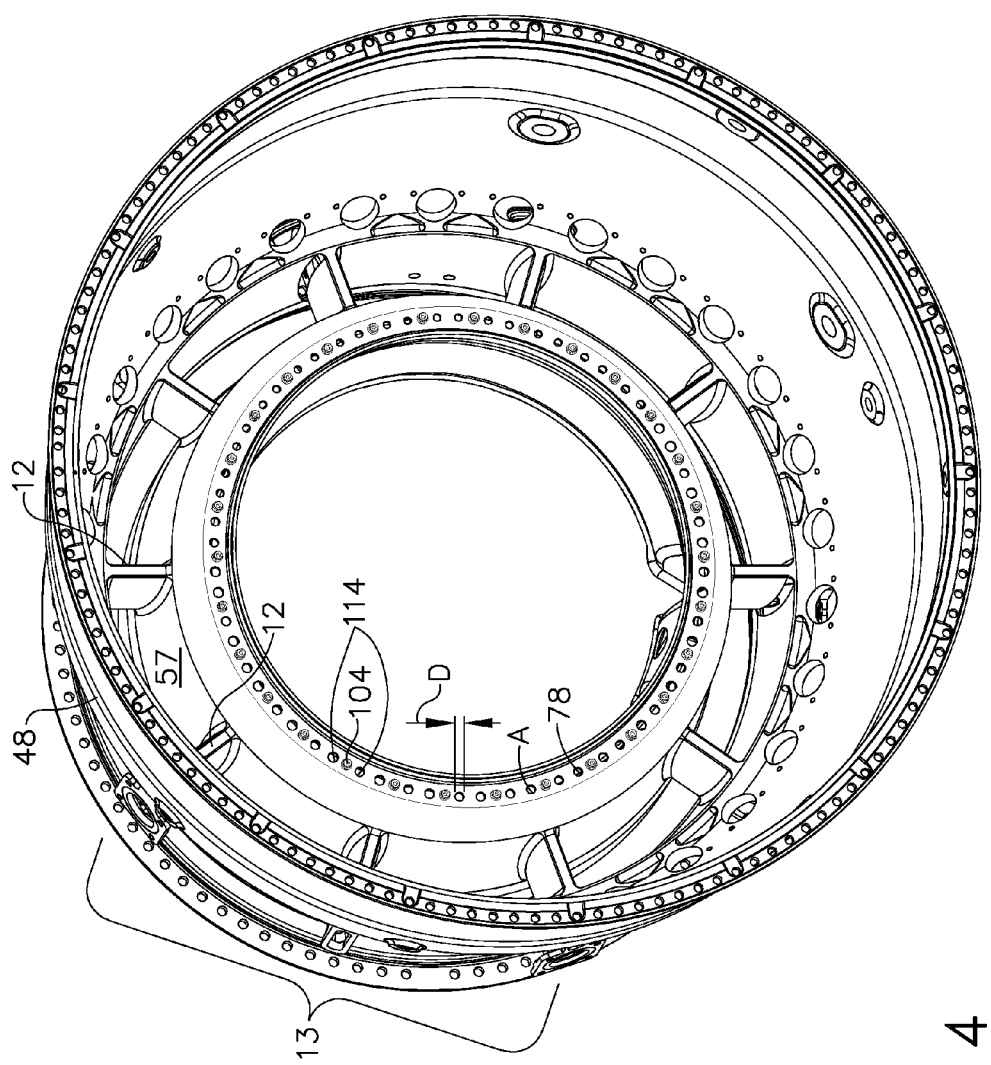
FIG. 4 is a perspective view illustration of a steam injection baffle of the steam injection manifold illustrated in FIG. 1.

Referring to FIGS. 3 and 4, the steam injection holes 78 are circumferentially distributed through and around the aft manifold wall 81 and more particularly around the aft baffle flange 88. The steam injection holes 78 face axially aftwardly or downstream and are illustrated herein as having centerlines or normals 79 perpendicular to aft planes 87 of the steam injection holes 78. The normals 79 are generally parallel to the engine centerline 11. The steam injection holes 78 are illustrated herein as being arranged evenly distributed around the aft baffle flange 88 with a bolt 104 disposed circumferentially between every other pair 114 of aligned sets of the first and second bolt holes 100, 101. Other circumferential arrangements of steam injection holes and sets of the first and second bolt holes 100, 101 may be used.

The annular outer baffle wall 84 narrows in an aftwardly or downstream direction 89 in which a radius R of the converging outer baffle wall 84 has a maximum radius R1 at the forward baffle flange 86 and a minimum radius R2 at the aft baffle flange 88. The annular outer baffle wall 84 also has a curved convex surface S that generally conforms to an inner band streamline 121 emanating from the diffuser outlet 64 and along the inner band 54. The contour of the annular outer baffle wall 84 and its surface S is designed to conform to flow streamlines, as may be predicted and determined by computational fluid dynamics (CFD) models of the diffuser/combustion system without the steam injector 76 present. Other methods including empiracle and semi-empiracle modeling of the flow field may be used to determine the streamlines. This contoured shape allows for steam manifolding and injection aft or downstream of the diffuser 48 with minimal or no disruption to the combustor airflow or pressure distribution.

The annular outer baffle wall 84 is substantially flush with the inner band 54 of the diffuser 48 at the diffuser outlet 64. Flow streamlines 122, including the inner band streamline 121, emanating from the diffuser outlet 64 may be determined empirically, semi-empirically, or by mathematical flowfield analysis. Constructing and locating the outer baffle wall 84 in the manner described above minimizes detrimental aerodynamic effects of the steam injector 76 and the outer baffle wall 84 on the flow field in and the operation of the combustion chamber 46. The steam injector 76 and outer baffle wall 84 as disclosed herein is designed to produce no noticeable effect on the pressure and flowfield in the combustion chamber 46.

Figure 5:
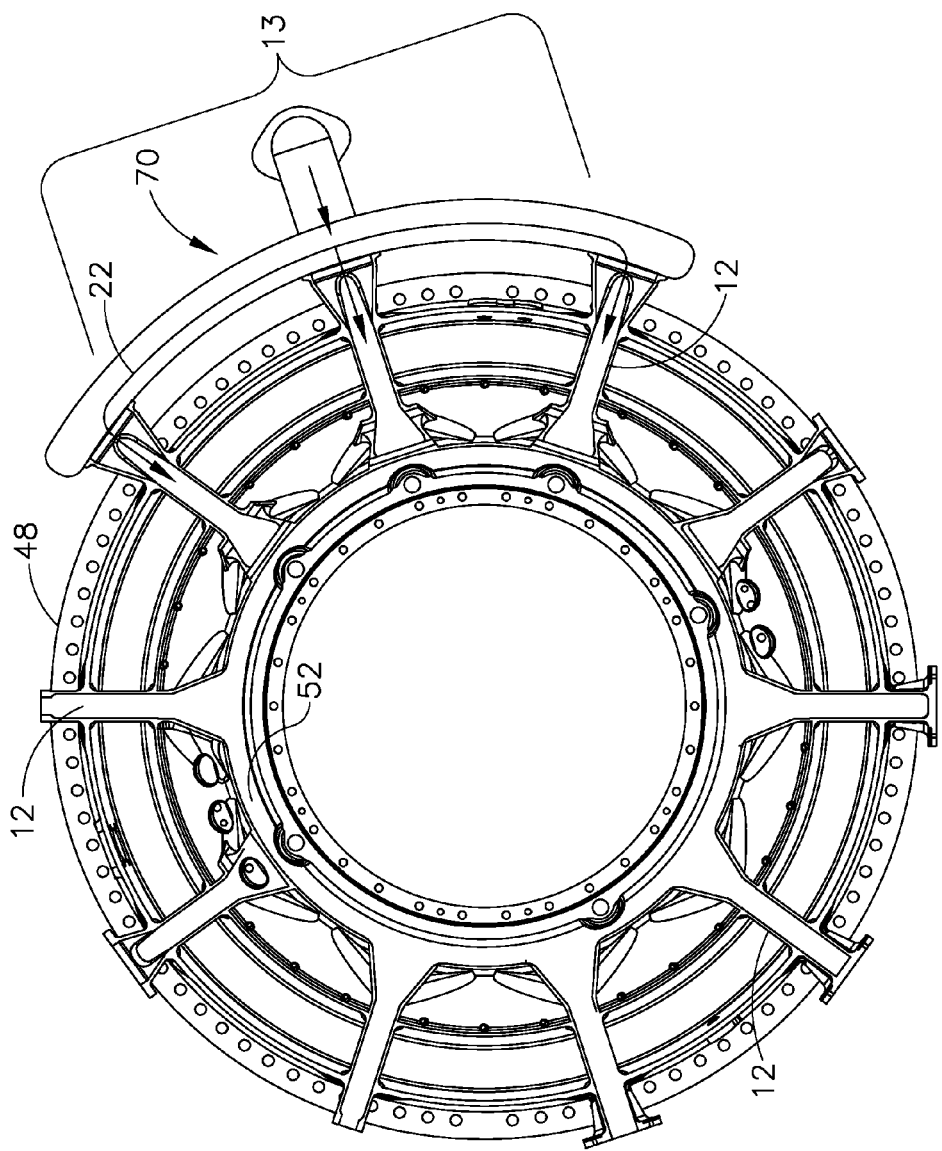
FIG. 5 is a schematical illustration of a steam supply manifold to distribute steam to the steam injection apparatus illustrated in FIG. 3.

It is also desirable to provide for a circumferentially uniform or axisymmetrical distribution of the steam injection from the steam injection manifold into the combustion chamber. However, often it is not feasible or possible to evenly or uniformly distribute the steam 22 from the outer steam supply header 24 through all of the struts 12. Illustrated in FIG. 5 is an exemplary embodiment of a steam supply system 70 in which the outer steam supply header 24 is semi-annular. The steam supply system 70 supplies steam 22 through only a portion 13 of the struts, the portion 13 being illustrated by three out of the ten hollow struts 12 illustrated in FIG. 5. The struts 12 in portion 13 are illustrated as being adjacent each other by three out of the ten hollow struts 12 illustrated and other configurations may be used. The three adjacent struts 12 illustrate a circumferentially non-uniform distribution of the struts 12 supplying steam to the annular steam cavity 52. Thus, the annular steam cavity 52 receives a non-axisymmetric or circumferentially non-uniform distribution of steam. In order to provide a circumferentially uniform or axisymmetrical distribution of the steam injection from the steam injector 76 into the combustion chamber, the steam injection holes 78 in the aft baffle flange 88 are non-uniformly sized around the aft baffle flange 88 of the steam injector 76 to inject the steam 22 at a uniform or near uniform rate around the baffle flange 88 of the steam injector 76. The non-uniformly sized steam injection holes 78 in the aft baffle flange 88 are indicated by non-uniform exit areas A and diameters D of the circular steam injection holes 78 in FIGS. 3 and 4. In one example, the non-uniform diameters D vary from 0.32 inches to 0.40 inches. This non-uniform hole diameter and size pattern compensates for the non-uniform pressure/flow variation within the steam cavity 52 within the cavity casing 50 due to the non-uniform number of passage inlets 71 to the fluid passages 68 leading to the steam manifold 49.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

The invention claimed is:

1. A gas turbine engine steam injector comprising:
   an annular steam injection manifold located upstream of a gas turbine engine combustor and aftwardly bounded by an aft manifold wall,
   the aft manifold wall located axially aft and radially inwardly of a diffuser outlet, and
   steam injection holes disposed through and circumferentially around the aft manifold wall and located axially aft and radially inwardly of the diffuser outlet.

2. A steam injector as claimed in claim 1, further comprising the steam injection holes being circumferentially evenly distributed around the aft manifold wall.

3. A steam injector as claimed in claim 2, further comprising:
   the annular steam injection manifold circumscribing a centerline,
   the steam injection holes facing axially aftwardly or downstream, and
   normals perpendicular to aft planes of the steam injection holes and generally parallel to the centerline.

4. A steam injector as claimed in claim 2, further comprising the steam injection holes being non-uniformly sized around the aft manifold wall.

5. A steam injector as claimed in claim 4, further comprising the steam injection holes having non-uniform exit areas.

6. A steam injector as claimed in claim 5, further comprising:
   the annular steam injection manifold circumscribing a centerline,
   the steam injection holes being circular and having non-uniform diameters facing axially aftwardly or downstream, and
   normals perpendicular to the exit areas of the steam injection holes and generally parallel to the centerline.

7. A steam injector as claimed in claim 1, further comprising an annular baffle having an annular radially outer baffle wall radially outwardly bounding the steam injection manifold and narrowing in an aftwardly or downstream direction and the outer baffle wall having a curved convex surface.

8. A steam injector as claimed in claim 7, further comprising the curved convex surface generally conforming to a streamline emanating from the diffuser outlet of a diffuser.

9. A steam injector as claimed in claim 8, further comprising the steam injection holes being circumferentially evenly distributed around the aft manifold wall.

10. A steam injector as claimed in claim 9, further comprising the steam injection holes being non-uniformly sized around the aft manifold wall.

11. A steam injector as claimed in claim 10, further comprising the steam injection holes having non-uniform exit areas.

12. A steam injector as claimed in claim 11, further comprising:
    the annular steam injection manifold circumscribing a centerline,
    the steam injection holes being circular and having non-uniform diameters facing axially aftwardly or downstream, and
    normals perpendicular to the exit areas of the steam injection holes and generally parallel to the centerline.

13. A gas turbine engine steam injection system comprising:
- a diffuser including radially outer and inner bands and hollow struts extending therebetween,
- an annular outer steam supply header spaced radially outwardly of the diffuser in steam supply communication with a fluid passage of at least one of the struts,
- a passage outlet of the fluid passage open to a steam cavity within an annular cavity casing located radially inwardly of the inner band,
- an annular steam injector including an annular steam injection manifold aftwardly bounded by an aft manifold wall,
- openings in an aft cavity wall between the steam cavity and the steam injector,
- the aft manifold wall located axially aft and radially inwardly of a diffuser outlet of the diffuser, and
- steam injection holes disposed through and circumferentially around the aft manifold wall.

14. A steam injection system as claimed in claim 13, further comprising:
- the annular outer steam supply header in steam supply communication with fluid passages in only a portion of the struts,
- the portion of the struts being circumferentially non-uniformly distributed around the diffuser, and
- the steam injection holes being circumferentially evenly distributed and non-uniformly sized around the aft manifold wall.

15. A steam injection system as claimed in claim 14, further comprising the steam injection holes having non-uniform exit areas.

16. A steam injection system as claimed in claim 15, further comprising:
- the annular steam injection manifold circumscribing a centerline,
- the steam injection holes being circular and having non-uniform diameters facing axially aftwardly or downstream, and
- normals perpendicular to the exit areas of the steam injection holes and generally parallel to the centerline.

17. A steam injection system as claimed in claim 13, further comprising an annular baffle having an annular radially outer baffle wall radially outwardly bounding the steam injection manifold and narrowing in an aftwardly or downstream direction and the outer baffle wall having a curved convex surface.

18. A steam injection system as claimed in claim 17, further comprising:
- the annular outer steam supply header in steam supply communication with fluid passages in only a portion of the struts,
- the portion of the struts being circumferentially non-uniformly distributed around the diffuser, and
- the steam injection holes being circumferentially evenly distributed and non-uniformly sized around the aft manifold wall.

19. A steam injection system as claimed in claim 18, further comprising the steam injection holes having non-uniform exit areas.

20. A steam injection system as claimed in claim 19, further comprising:
- the annular steam injection manifold circumscribing a centerline,
- the steam injection holes being circular and having non-uniform diameters facing axially aftwardly or downstream, and
- normals perpendicular to the exit areas of the steam injection holes and generally parallel to the centerline.

21. A steam injection system as claimed in claim 20, further comprising the curved convex surface generally conforming to a streamline emanating from a diffuser outlet of the diffuser.

22. A steam injection system as claimed in claim 13, further comprising:
- the annular outer steam supply header in steam supply communication with fluid passages in only a portion of the struts,
- the struts in the portion being adjacent to each other, and
- the steam injection holes being circumferentially evenly distributed and non-uniformly sized around the aft manifold wall.

23. A steam injection system as claimed in claim 22, further comprising the steam injection holes having non-uniform exit areas.

24. A steam injection system as claimed in claim 23, further comprising:
- the annular steam injection manifold circumscribing a centerline,
- the steam injection holes being circular and having non-uniform diameters facing axially aftwardly or downstream, and
- normals perpendicular to the exit areas of the steam injection holes and generally parallel to the centerline.

25. A steam injection system as claimed in claim 22, further comprising an annular baffle having an annular radially outer baffle wall radially outwardly bounding the steam injection manifold and narrowing in an aftwardly or downstream direction and the outer baffle wall having a curved convex surface.

26. A steam injection system as claimed in claim 18, further comprising:
- the outer baffle wall extending aftwardly from a forward baffle flange to an aft baffle flange,
- the forward and aft baffle flanges extending radially inwardly from the outer baffle wall,
- the aft manifold wall includes a ring flange bolted to the aft baffle flange, and
- the steam injection holes circumferentially distributed through and around the aft baffle flange.

27. A steam injection system as claimed in claim 26, further comprising the steam injection holes having non-uniform exit areas.

28. A steam injection system as claimed in claim 27, further comprising:
- the annular steam injection manifold circumscribing a centerline,
- the steam injection holes being circular and having non-uniform diameters facing axially aftwardly or downstream, and
- normals perpendicular to the exit areas of the steam injection holes and generally parallel to the centerline.

29. A steam injection system as claimed in claim 28, further comprising the curved convex surface generally conforming to a streamline emanating from a diffuser outlet of the diffuser.

* * * * *